Feb. 20, 1945. J. B. POWERS 2,369,850
SUGAR BEET TOPPER
Filed June 22, 1943 4 Sheets-Sheet 1

INVENTOR
JOHN B. POWERS
BY Charles S. Evans
HIS ATTORNEY

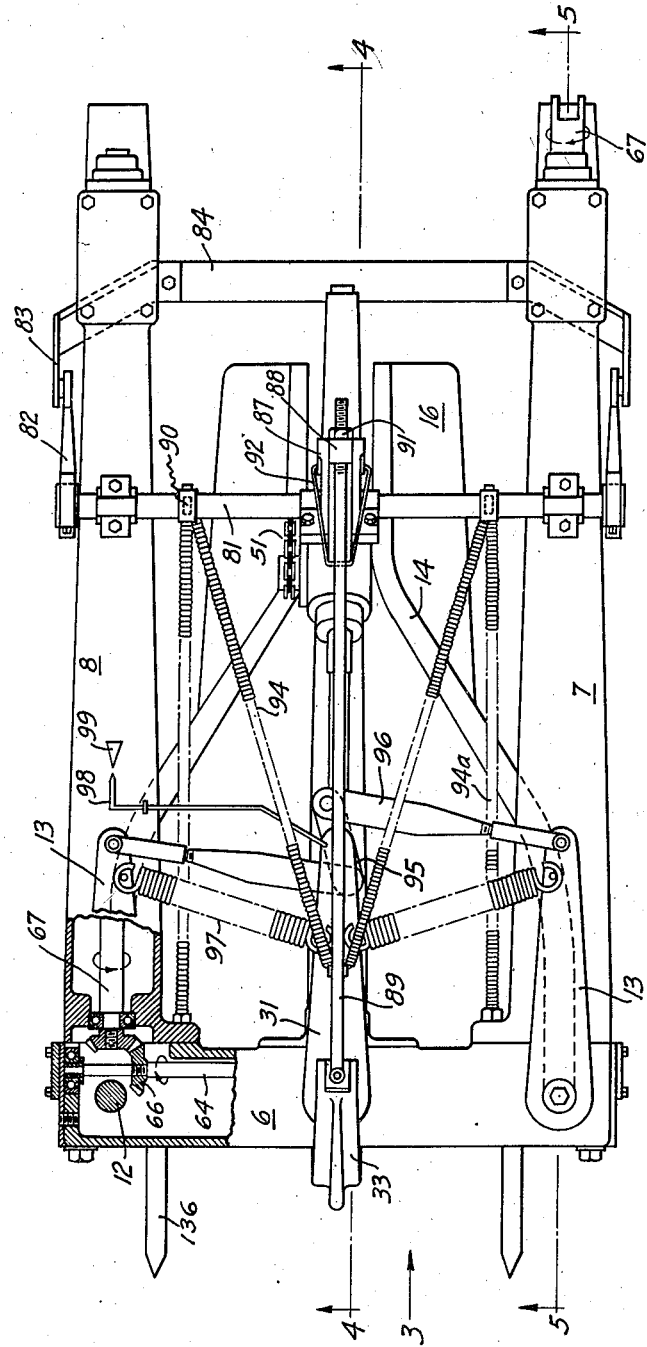

Feb. 20, 1945. J. B. POWERS 2,369,850
SUGAR BEET TOPPER
Filed June 22, 1943 4 Sheets-Sheet 3

INVENTOR
JOHN B. POWERS
BY Charles A. Evans
HIS ATTORNEY

Feb. 20, 1945. J. B. POWERS 2,369,850
SUGAR BEET TOPPER
Filed June 22, 1943 4 Sheets-Sheet 4

INVENTOR
JOHN B. POWERS
BY Charles S. Evans
HIS ATTORNEY

Patented Feb. 20, 1945

2,369,850

UNITED STATES PATENT OFFICE 2,369,850

SUGAR BEET TOPPER

John B. Powers, Davis, Calif., assignor to United States Beet Sugar Association, Washington, D. C., a corporation of Utah Application June 22, 1943, Serial No. 491,761

13 Claims. (Cl. 55—107)

My invention relates to harvesting machines and particularly to machines for topping sugar beets.

One of the objects of the invention is the provision in a beet harvester of automatically operating means for removing the leafy top growth and the desired fraction of the crown from each beet as the harvesting machine is driven along a row of beets.

Another object of the invention is the provision of means acting at the time the beet is topped which applies an opposing pressure to the crown so that the pressure of the topping knife does not displace or damage the beet root.

Another object of the invention is the provision of means for grasping the severed top portions of the beet and delivering them to a conveyor.

Another object of the invention is the provision of a topping mechanism supporting frame which maintains itself at a fixed height with respect to the ground immediately adjacent to the beet row so that a stable and relatively fixed mounting is provided for the operating parts.

Still another object of the invention is the provision of mechanism for conditioning the row prior to the actual topping operation so that the ends of the topping knife operate above the ground surface; and removal of debris from the rows and from the topping knife is facilitated.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In the drawings,

Figure 2 is a plan view of the topping mechanism. The supporting links and vehicle are omitted.

In terms of broad inclusion the beet topper of my invention comprises a frame suspended for vertical movement from a suitable vehicle body. A portion of the weight of the frame is balanced by heavy springs, but a considerable portion of the weight is carried on shoes which drag along the ground as the vehicle progresses along the rows of beets. Since these parts engage the ground close to the row, the frame is maintained in a fixed relation vertically with respect to the ground immediately adjacent the beet row irrespective of movements of the vehicle. Pivotally suspended on the frame is the topping knife; and means are provided responsive to the height of the beets in the row for raising and lowering the knife so that a fixed fraction of the crown of each beet is removed. The amount of useless crown which it is desired to take off varies in accordance with the size of the beet; and since the larger beets extend further out of the soil a greater thickness is removed than in the case of smaller roots. The thickness of crown which should be removed has a definite relation to the height of the root above the ground; and I have taken advantage of this fact to provide a gauging mechanism which travels over the top of the beets as the machine passes down the row raising and lowering the cutting knife in accordance with the height above the ground of the beet to be cut. Means are also incorporated in the gauging mechanism for applying to the beet a force contrary to that exerted by the cutting knife so that the beet is supported against the thrust of the knife and is not pushed over or broken. Means are also provided for sweeping up the debris left by the topping knife and conveying it out of the way. Means are also provided for automatically centering the gauging device upon the row of beets being harvested; and a visual indicator is provided so that the operator can keep his machine within reasonable limits to permit the automatic mechanism to function. Associated with the ground engaging shoes are feeler arms which tend to follow in close on each side of the row as the machine travels along the row. Mechanism connecting the feeler arms and gauging device keep the latter centered between the feeler arms so that the gauging device is maintained very closely over the center portion of the beets, any lateral shifting of the feeler arms in a horizontal plane being instantly reflected in a corresponding movement of the gauging device, whereas vertical movement of the gauging device due to variations in the size of the beet roots is reflected in vertical adjustment of the knife to vary the amount of top cut off.

Figure 3:
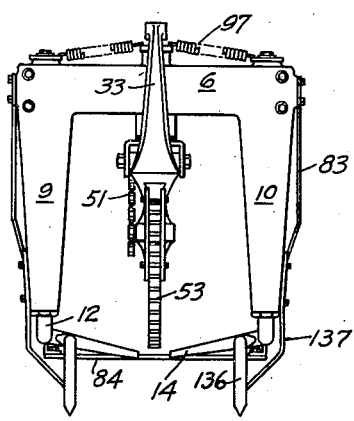
Figure 3 is an end elevation of the topping mechanism taken from the direction indicated by the arrow 3 of Figure 2.

In greater detail the topping mechanism includes a frame comprising the transverse horizontal member 6 on the ends of which are secured horizontal members 7 and 8 and vertical members 9 and 10, so that a pair of spaced horizontal frame members extends rearwardly from the leading transverse member as shown in Figure 2; and a pair of spaced vertical members extends downwardly toward the ground from such leading transverse member as shown in Figure 3. These frame members are hollow and provide a secure and protected support and housing for the various parts of the operating mechanism.

Figure 5:
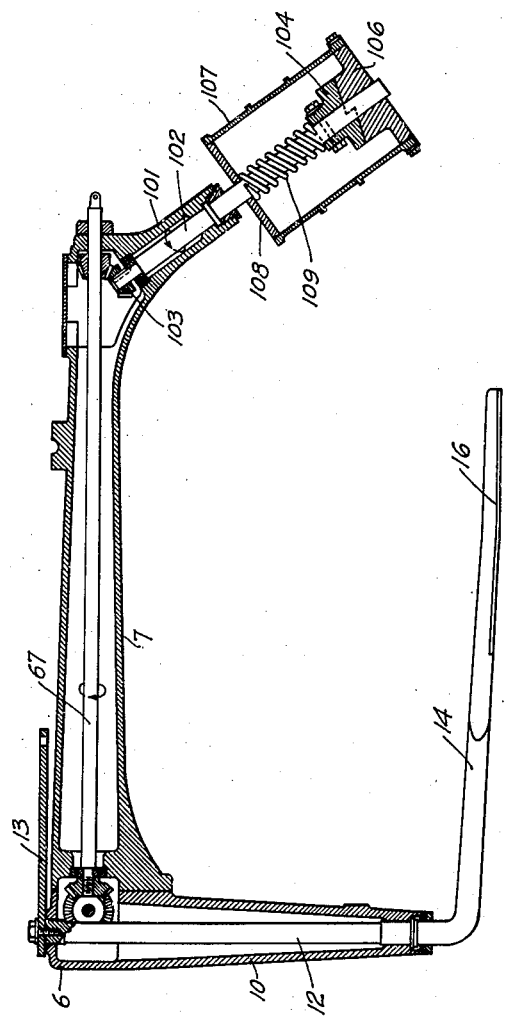
Figure 5 is a vertical section, the plane of section being indicated by the line 5—5 of Figure 2.

Journaled in each of the vertical frame members as shown in Figure 5, is a shaft 12 having a lever arm 13 fixed at its upper end; and at its lower end being extended in the feeler arm 14. The feeler arms are curved inwardly toward the center line of the machine as indicated in Figure 2, and are provided at their rear ends with shoes 16 which engage the ground and provide most of the support for the frame, so that it bears a more or less constant relationship in height to the soil over which the shoes pass. The frame and its contained mechanism is pivotally supported from a vehicle generally designated by the numeral 17. This is done by two pairs of bell crank levers 18 and 19, one of each pair being arranged on each of the lateral sides of the topper frame. One of the levers 18 is fixed at its apex point on the shaft 21 extending across the vehicle frame and journaled in brackets 22 fixed on the vehicle. The lever is generally of 90° spread, one of its arms being disposed horizontally and its end connected by a pivot 23 to the topper frame. A similar bell crank lever is fixed on the shaft 21 on the opposite side of the vehicle to mount the opposite side of the topper frame.

One of the levers 19 is similarly mounted on each side of the vehicle frame on a shaft 20 journaled in a bracket 22a fixed on the vehicle, and connected by pivot pin 24 to the topper frame. The vertical arms of the levers 18 and 19 on each side are connected by a rod 26, so that the topper frame moves in parallelism about the pivot mountings of the bell crank levers. In order to support part of the weight of the topper frame and mechanism, a spring 27 is disposed between the front of the frame and a portion of the vehicle. It is not desired to have the shoes penetrate into soft ground too deeply and the springs are therefore provided to resist the downward swing of the frame.

Figure 4:
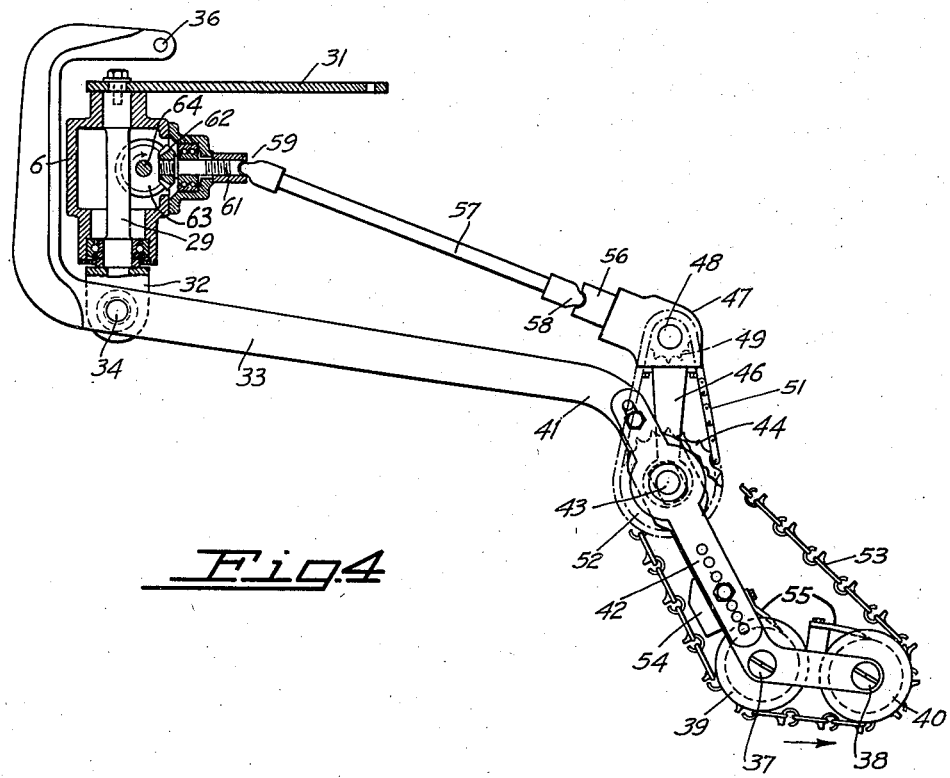
Figure 4 is an elevation partly in vertical section and showing the gauging mechanism. The plane of projection is indicated by the line 4—4 of Figure 2.

The two shoes and feeler arms drag along each side of the row of beets down which the machine is travelling and means are provided for making each of the feeler arms travel in snugly toward the row. Means are also provided for gauging the height of each beet in order to set the cutting knife appropriately and this gauging means is kept in the center of the row by means responsive to movement of the feeler arms. Journaled vertically at the center of the transverse arm 6 is a short shaft 29 on the top of which is fixed the lever arm 31 and on the bottom of which is fixed the yoke 32 on which the gauging arm 33 is pivoted on the horizontal pin 34. The gauging arm 33 as shown in Figure 4 extends forwardly and upwardly around the transverse frame member terminating in an eye 36. Thus, the vertical rocking of the gauging arm 33 about the pin 34, moves the eye 36 back and forth longitudinally with respect to the vehicle but without effecting movement of the arm 31; and swinging movement of the gauging arm 33 from side to side about the short shaft 29 imparts a corresponding side to side swinging of the lever arm 31.

The other end of the gauging arm 33 extends rearwardly of the pivot pin being bent as shown in Figure 4 to provide at its terminal end a mounting for the pins 37 and 38 on which are journaled respectively the flanged pulleys 39 and 40. The gauging arm from the bend 41 is bifurcated so that the pulleys 39 and 40 lie between the arm members. Adjustably mounted on the outside faces of the bifurcated gauging arm are the bars 42 in which is journaled the shaft 43 on which the sprocket 44 is fixed. The shaft 43 also provides a journal mounting for the yoke 46 on which the head 47 is carried. Journaled in the head is the shaft 48 carrying the sprocket 49 connected by chain 51 with the sprocket 44. A second sprocket 52 also fixed on the shaft 43 and between the sides of the gauging arm, drives chain 53 which runs over the pulleys 39 and 40. A skid block 54 is fixed on the lower portion of the gauging arm above the pulley 39 to prevent undesired displacement of the chain 53 during operation of the device; and scrapers 55 keep the pulleys clean.

Figure 1:
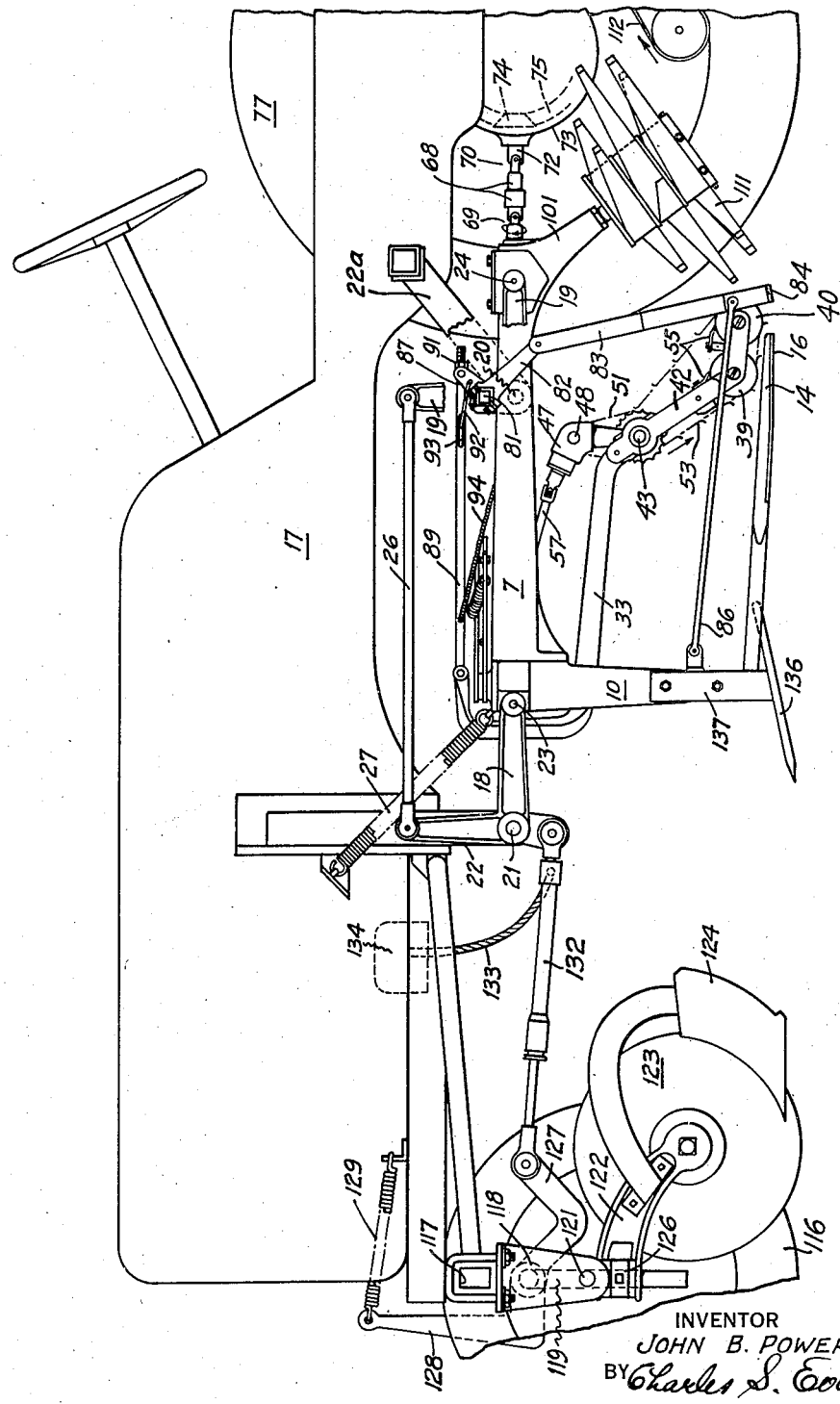
Figure 1 is a partial elevation of my beet topper and the supporting vehicle, portions being omitted to reduce the length of the figure.

The head 47 also provides a journal mounting for the short shaft 56 connected to the shaft 48 inside the head by bevel gears. The shaft 56 is connected by the shaft 57 and universal couplings 58 and 59 with the stub shaft 61, journaled in the side of the transverse member 6, and carrying on its inner end the bevel gear 62. This gear is in mesh with gear 63, fixed on the transverse shaft 64, journaled in the transverse frame member 6. This shaft is connected by suitable bevel gears 66 with a shaft 67 journaled in each of the horizontal frame members. One of these shafts 67, preferably the near one as viewed in Figure 1, is connected by extensible splined shaft sections 68 and universal couplings 69 and 70 with the short shaft 72, journaled in the housing 73, and carrying at its inner end the bevel gear 74, meshing with the bevel gear 75 which turns with the rear driving wheel 77 of the vehicle.

From the above it will be clear that forward motion of the vehicle is transmitted through one of the shafts 67, shaft 64, shaft 57 and sprocket chain 51 to the sprocket 44 and the chain 53 which is driven in the direction of the arrow. The proportion of parts is such that the speed of the chain is slightly in excess of the ground speed of the vehicle and topper mechanism as a whole.

Means are provided for cutting off or topping the beet; and because the gauging mechanism just described rises and falls as it rides over the different beets, this movement is utilized to adjust the cutting knife to remove a predetermined top portion of each beet. Journaled in suitable bearings fixed on the horizontal frame members 7 and 8 is a shaft 81 having a lever arm 82 fixed on each end. Pivotally connected to the end of each lever arm is a link 83, the two links being fixed on opposite ends of the cutting blade 84 which extends transversely across the frame just to the rear of the shoes 16 and gauging chain or runner 53. In order to properly fix the limits of movement of the cutting blade 84, it is pivotally connected to the forward frame members 9 and 10 on each side of the frame by a link 86. Thus rotation of the shaft 81 raises or lowers the horizontal position of the blade 84, the links 86 supporting and permitting free movement of the blade.

The mechanism is so constructed and proportioned that links 83 are substantially vertical and the lower surface of blade 84 is substantially horizontal when arms 82 are horizontal. As shaft 81 is rotated so as to lower the topping knife, the ends of arms 82, pivotally connected to links 83, move at first substantially downward and then downward and forward. This causes links 83 to incline in such manner as to impart a considerable ground suction angle to the knife 84 as it approaches ground level. This further assists the knife to penetrate hard ground.

Means are provided for connecting the shaft 81 to the gauging mechanism so that vertical movement of the gauging mechanism is reflected in a corresponding adjustment of the cutting blade. It is necessary that the topping knife move in a horizontal path until it has passed completely through the beet. If a rigid connection were maintained between the gauging mechanism and the cutting blade, the blade would drop and break off a part of the beet top as the gauging mechanism left the beet. Linkage is therefore provided for connecting the gauging arm and the knife, which raises the knife a fixed fraction of the distance through which the gauging surface is raised in passing over a beet, but which permits the gauging arm to swing downward as it leaves the beet without lowering the knife, the gauging runner or chain 53 being held in contact with the beet crown throughout the cut so that the cut is straight across and breakage is prevented. The gauging runner must not, however be allowed to swing down far enough to engage the knife and damage the mechanism.

Fixed on the central portion of the shaft 81 is a bifurcated lever arm 87, between the ends of which is pivotally mounted a block 88. Passing through the block and connected by a universal joint to the eye 36 of the gauging arm 33 is a link 89. A nut 91 threaded on the end of the rod provides an adjustable stop so that when the gauging arm is raised by a high beet, the lever arm 87 is pulled forwardly to raise the blade a corresponding amount. By adjusting this nut on the rod, the operator may increase or decrease the thickness of the material removed from the beet. A bridle 92, pivotally connected to each side of the bifurcated lever arm 87, passes through a slot 93 in the link 89. Springs 94, Figure 2, are interposed between the link 89 and a short lever arm 90 extending below the shaft 81.

Since in gauging a high beet the vertical separation of the gauging runner and the knife is greater than when topping a low beet, and since the minimum permissible separation or clearance between the runner and the knife is independent of their elevation above ground level, it follows that the gauging surface may be allowed to fall independently of the knife through a greater distance when topping a high beet than when topping a low one. This action is accomplished through the mechanism just described. After the gauging surface has passed the highest point of the beet crown and while the knife is still embedded in the beet, springs 94 acting on the gauging arm through link 89 cause the gauging surface to be held firmly against the beet crown. As the gauging arm swings down in accordance with the contour of the beet crown, link 89 slides rearwardly through block 88 until bridle 92 contacts the forward end of slot 93. Further descent of the finder is prevented by the bridle until the knife has passed through the beet and has begun its descent. Since the bridle is pivoted to arms 87 at a point between the pivot of block 88 and the axis of shaft 81, it will move rearwardly in slot 93 as the gauging arm is raised. This permits the gauging surface to fall through a greater distance when topping a high beet than when topping a low one. By properly locating the pivot points of the bridle on arms 87, the minimum clearance between the gauging surface and the knife may be held approximately constant throughout the working range.

As explained above, springs 94 are primarily used to hold the gauging surface firmly against the beet crown. They also serve to accelerate the descent of the gauging arm. The rearward ends of these springs could be attached to the frame and they would still perform these functions. However, a torque is required on shaft 81 to force the knife into the ground since the gauging arm will not force the knife lower than the fixed minimum clearance between them. Part of this torque is conveniently obtained by attaching the rearward ends of springs 94 to the short lever arms 90 extending below the shaft 81.

It is desirable that the gauging surface be held against the beet crown with only such force as is necessary to prevent beet breakage since any additional force clamps the knife between the crown and the beet root and increases the cutting load. Springs 94 are of such stiffness as to supply this force. They are not stiff enough to supply all of the torque required on shaft 81. Therefore additional springs 94a are provided, as shown in Figure 2, to connect the lever arms 90 to the frame.

Means are also provided for connecting the feeler arms to the gauging mechanism and for keeping the feeler arms snugly against the sides of the row, so that the gauging mechanism is maintained in fixed relation to the two feeler arms, preferably midway between them regardless of how far apart they may be. Pivotally mounted on the end of the lever arm 31, which it will be remembered is fixed for side to side swinging movement with the gauging arm 33 about the axis of the vertical shaft 29, Figure 4, is a short equalizing lever 95. Pivotally connecting the ends of the levers 13, which it will be remembered are fixed for pivotal motion with the feeler arms 14 about the axis of the shaft 12, and the ends of the equalizing lever 95, are links 96. Preferably the links are adjustable in length by being made in two parts threaded together as shown in Figure 2. The length of the lever arm for each of the levers 13 is the same, as is also the length of the lever arm on each side of the pivotal mounting of the equalizing lever 95.

With this sort of a connection it will be clear that in following the rows of beets the feeler arms may move laterally with respect one to the other, thus rocking the equalizing lever 95 but without disturbing the central position of its pivotal mounting on the lever arm 31. If however the two feeler arms move laterally to one side or the other the lever 31 and its connected gauging arm is also moved, so that the gauging mechanism is maintained centrally between the two feeler arms without regard to their movement toward and from one another and without regard to their bodily transverse movement. In order to keep the feeler arms pressed tightly against the rows at all times, springs 97 are arranged between each of the levers 13 and the lever 31.

The mechanism just described is of course designed to function within reasonable variations of the machine as it passes down the row; and in order to provide the operator with a visible guide for maintaining the feeler arms and gauging mechanism generally in the center of the frame, a pointer 98 is fixed to the lever arm 31 so that it moves with any lateral movement of the gauging mechanism. A fixed point 99 is arranged on the upper part of the frame member 8 so that when the two points are aligned, the gauging mechanism will be found centrally disposed below the frame. In operating the apparatus the driver of the vehicle will steer it so that pointers are as nearly in alignment as possible, and when deviation appears reestablishing alignment as soon as possible.

Since the feeler arms press snugly against the side of the row and since the gauging mechanism lies midway between the feeler arms, it follows that the gauging mechanism will ride over the beets in the row.

Means are provided for clearing away the debris from the cutting knife and sweeping it onto a conveyor which conveys the debris to a hopper or to one side of the machine. Each of the horizontal frame members is provided at its rear end with a downwardly projecting extension 101 as best shown in Figure 5. Journaled in each of these extensions is a shaft 102 connected to rotate with the shaft 67 by the bevel gears 103. Adjacent the lower end of each shaft is fixed a ratchet block 104 normally engaged with the complementary face of the disc 106 journaled on the lower end of the shaft and forming the end of a drum 107 having an opposite end 108 also journaled on the shaft. Interposed between the end 108 and the fixed block 104 is a spring 109 which serves to hold the end plate 106 and its associated drum against the ratchet block.

Fixed on the surface of the drum 107 in four groups spaced therealong are long spring arms 111 which preferably narrow as shown in Figure 1 toward the ends. The arms are made of relatively thin spring steel and pass outwardly from the drum in approximately the path of an involute and the length of the arms varies so that with the two drums rotating, the arms mesh loosely together, but without touching. The purpose of the ratchet in the drive of the drums is to allow the drums to be rotated in their normal running directions by high beets in case the drive fails while the machine is progressing along a beet row. The spring arms are made sufficiently flexible so that they may be wrapped tightly about the drum without damaging them. The drums normally rotate in opposite directions and as viewed in Figure 1 which is the left side of the machine from the driver's seat, the spring arms sweep around downwardly and forwardly, then inwardly toward the companion drum, then rearwardly and upwardly. Situated immediately behind and somewhat below the spring arms in their rearmost position is a conveyor belt 112 driven by any suitable connection with the drive wheel 77 of the vehicle.

The arrangement of the parts is such that severed tops and foliage from the beets is swept up by the rotating spring arms and thrown onto the conveyor belt which dumps the material thus collected in a suitable hopper or discharges it to one side of the vehicle. Beside removing the debris from the beet row, which is important to the operation of pulling the beets which immediately follows, the spring arms keep the knife clear, which is important in preserving its cutting function.

The front end of the vehicle is carried on the wheels 116 controlled in the usual manner, and mounted on the cross beam 117. Brackets 118 fixed to the beam provide journals for the pivotal mounting of the frame 119 on stub shafts 121 fixed on the frame, one on each side thereof. On the lower end of the pivoted frame on each side is journaled an arm 122, carrying a coulter or disc 123 and a plow 124. A collar 126 adjustably fixed on the frame, and interposed between the bifurcated end of the arm 122, provides means for adjusting the height of the arm, and the coulter and plow carried by it. Rigid with the pivoted coulter frame 119 are two oppositely extending arms 127 and 128, the latter connected by a spring 129 to the body of the vehicle. Interposed between the arm 127 and the lever 131, fixed on the shaft 21, is a hydraulic jack 132, connected by conduit 133 to the gear pump 134, driven preferably by suitable connection to the vehicle motor and controllable from the driver's seat.

The purpose of the jack is to raise both the topper frame and the coulters and plows above the ground when traveling to and from the field; and this is done for course, by pumping fluid into the jack so that the arm 131 is pushed to turn the shaft 21 counterclockwise, so that the bell crank levers 18 and 19 lift the topper frame and topping mechanism clear of the ground. At the same time the lever 127 rocks the coulter frame 119 about its pivots 121 in counterclockwise direction against the pull of the spring 129 lifting the coulters and plows. Release of pressure fluid at the proper time permits both topper frame and coulters and plows to swing down to operative positions. The caster mounting of coulters and plows permits ready return to proper relation when the machine as a whole is brought back into line after a momentary deflection. With no pressure fluid in the jack, movement of the topper frame is not communicated to the coulter frame, which is however responsive to the spring 129 which tends to force the coulters into the ground.

The reason for mounting a plow ahead of the topping mechanism on each side of the vehicle is to form a narrow trench at each side of the row. These trenches permit the ends of the cutting blade 84 to operate at all times above the ground surface, and thereby permit the sweeps 111 to remove the debris which would otherwise accumulate on the ends of the knife. The coulters 123 operate, one on each side of the row, to sever leaf stems and weeds which accumulate on the surface of the ground. The plows 124 remove some of this material but dead leaf stems which are forced into the ground before they are severed usually remain attached at one end to the beet crown. To prevent these being carried over the cutting blade with the crown while the other end remains buried in the ground so as to clog the blade, lifting points 136 are fixed at the lower end of each of the vertical frame members 9 and 10. Preferably each point is integral with a bracket arm 137 secured to the frame. The lifting points 136 operate slightly under the ground surface and are spaced apart a distance slightly less than that between the coulters so as to lift the buried leaf stems and comb them forward so that they are readily shed by the cutting blade.

In understanding the construction and functioning of the mechanism comprising my invention, it is necessary to remember that beets of large diameter grow to a greater height above the ground surface than those of smaller diameter. The point of first contact between the gauging runner 63 and beets of various heights will therefore progress forward on the runner as the beet diameter increases. It is necessary that the centering action of the gauging mechanism be completed before contact is made between beet and runner. It is however desirable to delay centering of the gauging mechanism as long as practicable to prevent a beet from interfering with the centering on the next beet. The contour of the inner surface of the runner chain is therefore such that centering occurs slightly before the instant of initial contact between the runner and a beet of any diameter.

The face of the runner chain moves rearwardly at a speed slightly in excess of the forward speed of the entire mechanism and vehicle. The runner has three distinct functions other than the gauging of the cut by the cutting knife 84. First through its climbing action, it minimizes the tendency of loosely held beets to lean forward and overturn when engaged by the runner or the knife. Second, the runner applies a rearwardly acting horizontal pressure to each crown throughout the cutting operation; and this eliminates the breakage of the root which is of frequent occurrence when a cutting knife passes through an unsupported beet. Third, the runner carries tops, crowns and weeds which would otherwise clog the working parts toward the rear where they can be caught by the sweeps and removed. The gauging runner is made as narrow as practicable to reduce its weight to the minimum and to permit it to thread its way through dense top growths and weeds, without pressing them into a mat which would unduly raise the gauging runner and thus set the knife too high.

The profile of the gauging runner is designed to satisfy four requirements: The runner reaches the uppermost portion of each beet crown before the knife enters the beet; and that portion in contact with the crown when the cut is begun is substantially horizontal regardless of beet height so that minor irregularities in beet contour do not materially affect the gauging of the cut. The portion of the runner which first touches a beet is sufficiently inclined to avoid pressing the beet forward or overturning it. The runner engages each beet at the latest instant consistent with satisfying the above requirements so as to minimize the tendency of a high beet to interfere with gauging of a small beet immediately preceding it in the row.

The ratio of the rise of the gauging surface to the rise of the knife is determined by the relative lengths of lever arms 87 and 82; and should preferably be about 1.4 for usual field conditions. The linkage connecting the gauging arm and the knife is so designed that for each inch that the gauging surface is raised with respect to the frame the knife is raised approximately 0.17 inch. Thus the vertical distance between the gauging surface and the knife, which is equal to the thickness of the slice removed from the beet root, is increased by approximately 0.3 inch for each inch that the gauging surface is raised with respect to the frame.

In the claims, I have used "horizontal" or "vertical" sometimes in connection with "plane" to define movements of various parts. The terms are not to be construed in their strict mathematical sense, but rather as indicating the general direction of movement. Thus by "vertical adjustment," is meant adjustment either up or down; and by "movement in a horizontal plane," is meant movement from side to side.

I claim:

1. A machine of the class described, comprising a frame, a pair of ground engaging feeler arms for supporting the frame and pivotally mounted on the frame for lateral movement relative thereto about a vertical axis, cutting means mounted on said frame for vertical adjustment, gauging mechanism pivotally mounted on said frame for movements in vertical and horizontal planes, means connecting the feeler arms and gauging mechanism for moving the gauging mechanism in a horizontal plane, and means connecting the gauging mechanism and cutting means for vertical adjustment of the cutting means.

2. A machine of the class described, comprising a frame, a pair of ground engaging feeler arms for supporting the frame and pivotally mounted on the frame for lateral movement relative thereto about a vertical axis, cutting means mounted on said frame for vertical adjustment, gauging mechanism pivotally mounted on said frame for movements in vertical and horizontal planes, means actuated by the feeler arms for maintaining the gauging mechanism in constant relation to the feeler arms, and means actuated by the gauging mechanism for vertically adjusting the cutting means.

3. A machine of the class described, comprising a frame, a pair of ground engaging feeler arms for supporting the frame and pivotally mounted on the frame for lateral movement relative thereto about a vertical axis, cutting means mounted on said frame for vertical adjustment, gauging mechanism pivotally mounted on said frame for movements in vertical and horizontal planes, means actuated by the feeler arms for maintaining the gauging mechanism centrally between the feeler arms, and means actuated by the gauging mechanism for vertically adjusting the cutting means.

4. A machine of the class described, comprising a frame, a pair of feeler arms pivotally mounted on the frame for movement in a horizontal plane, cutting means mounted on said frame for vertical adjustment, gauging mechanism pivotally mounted on said frame for movements in vertical and horizontal planes, a lever arm connected for movement with each said feeler arm and said gauging mechanism, an equalizing lever pivoted on the gauging mechanism lever arm, a link connecting each feeler arm lever arm to the equalizing lever, and means actuated by the gauging mechanism during its movement in a vertical plane for vertically adjusting the cutting means.

5. A machine of the class described, comprising a frame, a pair of ground engaging feeler arms for supporting the frame and pivotally mounted on the frame for lateral movement relative thereto about a vertical axis, cutting means mounted on said frame for vertical adjustment, gauging mechanism pivotally mounted on said frame for movements in vertical and horizontal planes, means connecting the feeler arms and gauging mechanism for moving the gauging mechanism in a horizontal plane, means connecting the gauging mechanism and cutting means for vertical adjustment of the cutting means, and a shoe associated with each feeler arm for supporting the frame.

6. A machine of the class described, comprising a frame, a pair of feeler arms pivotally mounted on the frame for movement in a horizontal plane, cutting means mounted on said frame for vertical adjustment, gauging mechanism pivotally mounted on said frame for movements in vertical and horizontal planes, means actuated by the feeler arms for maintaining the gauging mechanism in constant relation to the feeler arms, means actuated by the gauging mechanism for vertically adjusting the cutting means, and resilient arms constituting a sweep and rotatably mounted adjacent the cutting means.

7. A machine of the class described, comprising a frame, a pair of spaced shafts journaled vertically in said frame, a feeler arm and a lever arm fixed on each shaft, a gauging mechanism pivotally mounted on said frame for side to side movement therein, an equalizing lever pivotally mounted on the gauging mechanism, and links connecting the shaft arms to the equalizing lever to maintain the gauging mechanism midway between the feeler arms.

8. A machine of the class described, comprising a frame constituted of a transverse member to the ends of which are secured a pair of horizontal and a pair of vertical members, a ground engaging feeler arm journaled in each vertical frame member, a gauging mechanism pivotally mounted on the transverse frame member for movements in vertical and horizontal planes, a cutting blade mounted adjacent the free ends of said horizontal frame members for movement in a vertical plane, means responsive to vertical movement of the gauging mechanism for moving the cutting blade vertically, and means responsive to horizontal movement of the feeler arms for moving the gauging mechanism horizontally.

9. A machine of the class described, comprising a frame constituted of a transverse member to the ends of which are secured a pair of horizontal and a pair of vertical members, a ground engaging feeler arm journaled in each vertical frame member, a gauging mechanism pivotally mounted on the transverse frame member for movements in vertical and horizontal planes, a cutting blade mounted adjacent the free ends of said horizontal frame members for movement in a vertical plane, means responsive to vertical movement of the gauging mechanism for moving the cutting blade vertically, means responsive to horizontal movement of the feeler arms for moving the gauging mechanism horizontally, a shaft journaled adjacent the free end of each horizontal frame member, spring arms constituting a sweep mounted on said shafts, and driving shafts for imparting rotation to the sweep shafts and journaled in said horizontal frame members.

10. A machine of the class described, comprising a frame constituted of a transverse member to the ends of which are secured a pair of horizontal and a pair of vertical members, a ground engaging feeler arm journaled in each vertical frame member, a gauging arm pivotally mounted on the transverse frame member for movements in vertical and horizontal planes, a runner mounted on the gauging arm, a cutting blade mounted adjacent the free ends of said horizontal frame members for movement in a vertical plane, means responsive to vertical movement of the gauging arm for moving the cutting blade vertically, means responsive to horizontal movement of the feeler arms for moving the gauging arm horizontally, a shaft journaled in the transverse frame member, a driving shaft journaled in one of the horizontal frame members and connected to drive the transverse shaft, and means for driving the runner from the transverse shaft.

11. A machine of the class described, comprising a frame, cutting means mounted on said frame for vertical adjustment, gauging mechanism pivotally mounted on said frame for movement in a vertical plane, a link connected to the gauging mechanism for longitudinal movement therewith, means operative upon movement of the link in one direction to connect the link to lift the cutting means a distance bearing a predetermined ratio to the upward movement of the gauging mechanism and upon movement in the other direction to free the cutting means, and means operative after movement of the link in the other direction a predetermined distance to prevent further downward movement of the gauging means except with downward movement of the cutting means.

12. A machine of the class described, comprising a frame, gauging mechanism pivotally mounted in said frame for up-and-down movement relative thereto, a link connected to said gauging mechanism for movement longitudinally therewith, a shaft in said frame, lever arms fixed on the shaft, a cutting blade mounted on the lever arms, another lever arm fixed on the shaft, means connecting the link to the other lever arm for movement with the link in one direction only to lift the cutting blade, and means connecting the link to the other lever arm for movement with the link in the opposite direction after a predetermined free movement of the link.

13. In a machine of the class described, a frame, a pair of spaced shafts journaled vertically in said frame, a feeler arm and a lever arm fixed on said shaft, a single shaft journaled vertically in said frame between the pair of shafts, a lever arm fixed on said single shaft, an equalizing lever pivoted on said last named lever arm, links connecting the equalizing lever to the first named lever arms, a gauging arm pivotally mounted on the single shaft for movement in a vertical plane, sprockets journaled on the gauging arm, a chain disposed on the sprockets, a cutting knife adjacent one of the sprockets, means for supporting the knife, and means connecting the knife supporting means to the gauging arm whereby the upward movement of the gauging arm raises the knife in a predetermined ratio of movement.

JOHN B. POWERS.